US006935550B2

(12) United States Patent
Caldarone et al.

(10) Patent No.: US 6,935,550 B2
(45) Date of Patent: Aug. 30, 2005

(54) ROBOTIC POSITIONER

(75) Inventors: Andrew C. Caldarone, Mentor, OH (US); Dennis A. Quinn, Mentor, OH (US)

(73) Assignee: Lincoln Global Inc., Monterey Park, CA (US)

( * ) Notice: Subject to any disclaimer, the term of this patent is extended or adjusted under 35 U.S.C. 154(b) by 206 days.

(21) Appl. No.: 10/325,186

(22) Filed: Dec. 20, 2002

(65) Prior Publication Data

US 2004/0118897 A1 Jun. 24, 2004

(51) Int. Cl.[7] .............................................. B23K 37/00
(52) U.S. Cl. ........................ 228/49.2; 269/57; 269/58
(58) Field of Search ........................ 228/47.1, 48, 49.1, 228/49.2, 44.5; 269/57, 58

(56) References Cited

U.S. PATENT DOCUMENTS

| | | | | | |
|---|---|---|---|---|---|
| 192,813 | A | * | 7/1877 | Brooks et al. | 269/13 |
| 228,865 | A | * | 6/1880 | Brooks | 294/28 |
| 356,196 | A | * | 1/1887 | Eley | 228/26 |
| 386,759 | A | * | 7/1888 | Solter | 228/48 |
| 389,438 | A | * | 9/1888 | Brooks | 228/14 |
| 4,369,958 | A | * | 1/1983 | Maynard | 269/61 |
| 4,568,070 | A | * | 2/1986 | Severt | 269/60 |
| 4,660,753 | A | * | 4/1987 | Kushibe et al. | 228/48 |
| 4,737,611 | A | * | 4/1988 | Humblot | 219/86.25 |
| 5,083,070 | A | * | 1/1992 | Poupard et al. | 318/568.1 |
| 5,704,601 | A | * | 1/1998 | Mangelsen et al. | 269/57 |
| 6,036,082 | A | | 3/2000 | Caldarone | |
| 6,622,906 | B1 | * | 9/2003 | Kushibe | 228/212 |
| 6,634,484 | B2 | * | 10/2003 | Gattrell et al. | 198/375 |

FOREIGN PATENT DOCUMENTS

| | | | |
|---|---|---|---|
| DE | 3338771 A | * | 5/1985 |
| JP | 09103980 A | * | 4/1997 |

* cited by examiner

Primary Examiner—Kiley S. Stoner
(74) Attorney, Agent, or Firm—Fay, Sharpe, Fagan, Minnich & McKee, LLP

(57) ABSTRACT

A robotic positioner for use with an automated processing system, such as an automated welding system, for example, includes a base, a support structure rotatably supported on the base, and at least one work surface supported on the support structure suitable for supportably engaging a workpiece. The support structure extends from the base at an angle relative to vertical, and the work surface extends at an angle relative to the support structure. In operation, a workpiece is secured onto a work surface while in a generally horizontal load/unload position. The support structure and work surface thereon is then rotated into an inclined work position relative to horizontal that is adjacent the automated processing system. Thereafter, the work surface is rotated with the support structure back to the generally horizontal load/unload position so that the workpiece can be removed and another loaded. A robotic positioner having two or more work surfaces can have one work surface in the load/unload position while another is in the work position. Additionally, the work surfaces can be rotatably supported on the support structure, such as by a rotatable platform.

45 Claims, 9 Drawing Sheets

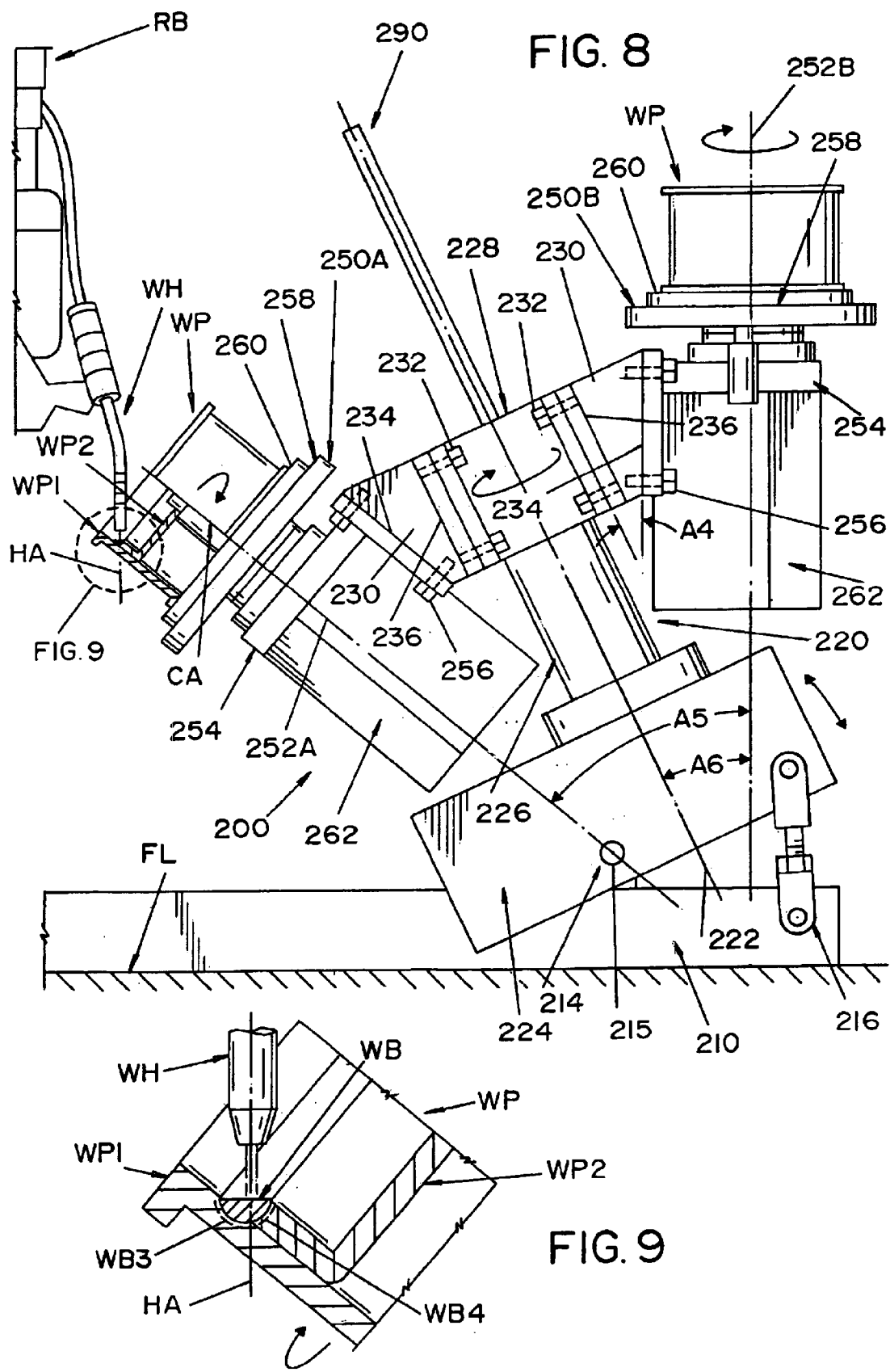

ROBOTIC POSITIONER

This invention relates to the art of automated welding systems and, more particularly, to a robotic positioner for introducing a workpiece to an automated welding head.

INCORPORATED BY REFERENCE

Robotic positioners are generally known, and one example of a robotic positioner is generally shown and described in Caldarone, U.S. Pat. No. 6,036,082, which is hereby incorporated herein by reference as background information.

BACKGROUND OF THE INVENTION

The present invention finds particular application in association with welding, and especially with automated welding systems, and will be described with particular reference thereto. It is to be appreciated, however, that the invention is equally applicable for use in association with numerous other automated systems or in any other suitable manner. For example, the present invention can be used in association with painting and/or other automated coating systems.

Robotic positioners have been provided heretofore and generally include, as shown in Caldarone, for example, two or more workpiece support platforms, each rotatable between a load/unload position and a working position. The working position might be adjacent a welding head for performing a welding operation, for example. Typically, a robotic positioner also includes one or more shields or guards extending along the positioner between the support platforms in the load/unload position and the working position. In many cases, the support platforms themselves are rotatable so that the workpiece being processed can be rotated while in the working position, for example. Additionally, it is often desirable to support the workpiece at an angle relative to horizontal while in the working position. As an example, it is desirable to have a welding head positioned so that the welding operation is generally vertical. This is normally referred to as down welding and is a process that can be used to produce high-quality weld joints if the geometry of the workpiece is properly oriented relative to the welding head. As such, robotic positioners commonly extend a support platform at an angle, such as 45 degrees, for example, relative to horizontal, when such a support platform is in the working position. Thus, in this example, the surfaces to be welded might extend at an angle of 90 degrees relative to one another and at 45 degrees relative to the welding head, permitting a high-quality weld joint to be formed as a result of the down weld operation.

Certain disadvantages exist, however, in known robotic positioners, such as Caldarone, for example. One disadvantage is that a support platform in the load/unload position is generally not horizontal when another support platform is in the working position and is properly oriented relative to a welding head, as discussed above, for example. It will be appreciated that workpieces are commonly fed to and taken away from a workstation by generally horizontal conveyors. As such, the workpieces thereon are likewise in a generally horizontal orientation. As a result, the loading and unloading of a workpiece on a non-horizontal support platform, such as is shown in Caldarone, for example, can be difficult and undesirably requires manual manipulation of the workpiece to properly orient and secure the same to the non-horizontal support platform. The same disadvantage exists when removing a processed workpiece from a support platform in the load/unload position as the processed workpiece generally must be reoriented, that is rotated or turned, into a suitable position to engage the generally horizontal conveyor.

Other robotic positioners are known that have just a single support platform supported on a base structure. The support platform typically includes two axes, one of which is a generally horizontal axis and the other a central axis extending generally transverse to the horizontal axis. The support platform is adapted to tilt about the horizontal axis and is rotatable about the central axis. However, since the robotic positioner has only one support platform, two or more robotic positioners are commonly used together at one time to form a work cell. One disadvantage of such arrangements is that the operator is required to walk back and forth between the two positioners to load or unload one workpiece while another workpiece is being processed on the other positioner. Another disadvantage of such arrangements is that the two robotic positioners have a total of four axes, and, therefore, also include at least four actuators for effecting rotation about these axes, as well as a control system for coordinating and controlling the operation of the two positioners. As such, these systems are complex and expensive to produce and maintain. Adding further to the expense is that safety equipment, such as shields and guards, for example, are required for both positioners. So, the cost of purchasing and maintaining such safety equipment can be significantly more expensive than that for only one positioner. Still another disadvantage is that the two machines can take up considerable floor space, which is a significant disadvantage in facilities where floor space is otherwise limited.

Still other robotic positioners are known that rotate two or more support platforms about a vertical axis rather than a horizontal axis, such as is shown in Caldarone, for example. Because such other robotic positioners rotate about a vertical axis, the positioners can either have two or more generally horizontal support platforms, two or more inclined support platforms, or two or more support platforms that each have a horizontal axis permitting selective pivoting or tilting of the support platform between horizontal and inclined orientations. Either of the two former configurations undesirably restrict the support platforms to either a respective horizontal working position or an inclined load/unload position, whereas the latter of the three positioners is configured such that each support platform has a horizontal axis that permits both a horizontal load/unload position and an inclined working position. This configuration, too, however, has disadvantages. One such disadvantage is that this robotic positioner has an additional axis for each support platform. As a result, this robotic positioner can have five or more axes, including one (1) central vertical axis, two (2) vertical platform axes, and at least two (2) horizontal axes for pivoting or tilting of the two platforms between horizontal and inclined orientations. This significantly increases the cost, size and overall complexity of both the robotic positioner, as well as the attendant control system therefor.

SUMMARY OF THE INVENTION

In accordance with the present invention, a robotic positioner is provided that avoids or minimizes the problems and disadvantages encountered in connection with robotic positioners of the foregoing character, and which provides advantages realized in connection with the use of associated automation systems, such as automated welding systems, for example, while promoting a desired simplicity of structure and economy of manufacture.

More particularly in this respect, a robotic positioner is provided that includes a base, and a support structure rotatably supported on the base and having an axis that extends from the base at an angle relative to vertical. The support structure supports a work surface that is rotatable with the support structure about the axis between a load/unload position and a work position adjacent an associated automation system, such as an automated welding system, for example. The work surface extends generally horizontally when in the load/unload position so that a workpiece delivered to the positioner for processing in a generally horizontal orientation can be secured to the work surface with minimal re-orientation of the workpiece. As the support structure is rotated around the structure axis, the work surface moves into the work position in which the work surface and an associated workpiece are disposed at an incline relative to horizontal. This is accomplished without additional actuators or horizontal axes, as are commonly found in known robotic positioners, resulting in reduced overall size and complexity of the positioner.

In accordance with another aspect of the present invention, the support structure supports a plurality of work surfaces, each rotatable with the support structure about the axis thereof between a load/unload position and a work position. Each work surface has an associated axis and is supported on the support structure such that each work surface is rotatable about its associated axis. Certain known robotic positioners that are displaceable between a horizontal load/unload position and an inclined work position include only one work surface supported on a horizontal axis. The work surface is rotated about the horizontal axis between the two positions. However, since these positioners are only suitable for having one work surface, two or more positioners are commonly used to maintain the desired throughput and operator efficiency levels. And, in such case, the operator walks back and forth between the machines to operate the same contemporaneously. The present invention can include two or more work surfaces so that a plurality of workpieces can be in process simultaneously and the desired throughput and operator efficiency levels can be maintained. Furthermore, the present robotic positioner will likely require less floor space than multiple, spaced-apart single work surface positioners.

In accordance with a further aspect of the present invention, a robotic positioner is provided in which the angle of the support structure axis is adjustable through a range of angular orientations. Additionally, the work surfaces are adjustably supported on the support structure to enable the work surfaces to remain in a generally horizontal orientation when in the load/unload position, independent of the angle of the support structure axis. As a result of adjusting the angle of the support structure axis and a corresponding adjustment of the orientation of the work surfaces relative to the support structure, the generally horizontal orientation of a work surface in the load/unload position can be maintained while the inclined orientation in the work position is modified. Such adjustments in prior robotic positioners typically require the work surface to tilt through a lesser or greater angle each time the work position is reached. As such, the present robotic positioner has reduced cycle times leading to greater production efficiency.

One object of the present invention is the provision of a robotic positioner of the foregoing character that provides a generally horizontal work surface for simplified loading and unloading of a workpiece and provides an inclined work surface for presenting an associated workpiece to a processing system in an inclined orientation while moving between these two positions with a minimum number of movements of the work surfaces.

Another object of the present invention is the provision of a robotic positioner of the foregoing character that provides multiple work surfaces, each suitable for supporting a workpiece, while reducing the overall size and complexity of the positioner so that the footprint and overall amount of floor space associated with the same is minimized.

Yet another object of the present invention is the provision of a robotic positioner of the foregoing character that permits loading and unloading from the same location, eliminating walking between two or more machines or loading/unloading stations, and reducing the number of safety zones and the attendant safety equipment associated with multi-zone positioners or multi-positioner systems, all while minimizing the number of movements of the work surfaces of the robotic position through a single production cycle.

A further object of the present invention is the provision of a robotic positioner of the foregoing character that has a reduced cost and minimized complexity relative to other known robotic positioners.

BRIEF DESCRIPTION OF THE DRAWINGS

The foregoing objects, and others, will in part be obvious and in part be pointed out more fully hereinafter in connection with a written description of the present invention illustrated in the accompanying drawings in which:

FIG. 8 is a side elevation view, partially in section, of another embodiment of a robotic positioner in accordance with the present invention shown in use with an associated welding head;

FIG. 9 is an enlarged cross-sectional side elevation view of the workpiece and welding head shown in FIG. 8;

DESCRIPTION OF PREFERRED EMBODIMENTS

Figure 1:
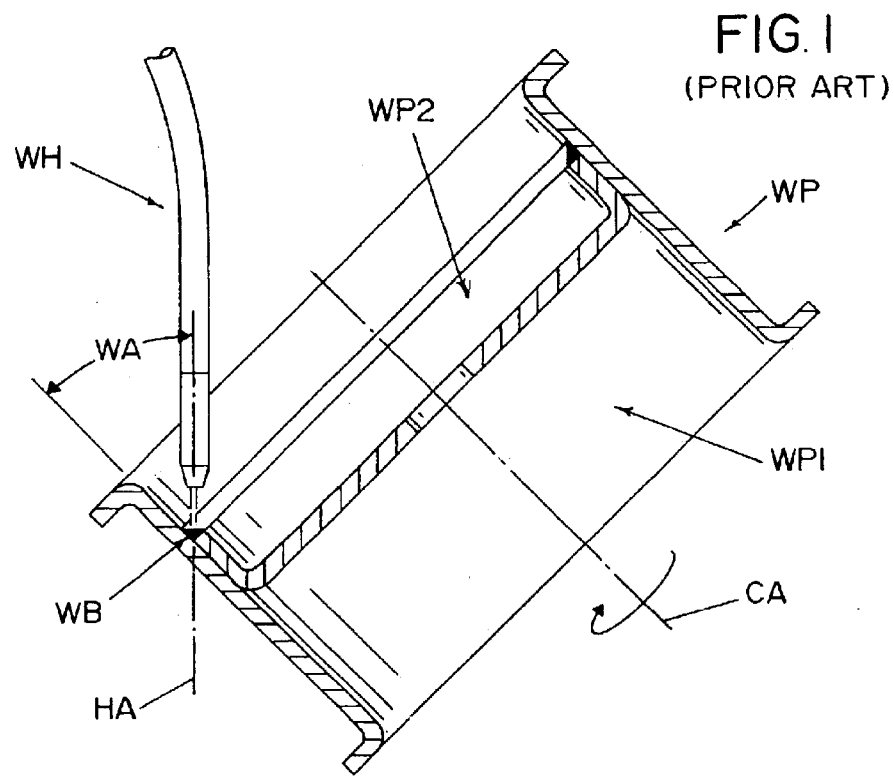
FIG. 1 is a cross-sectional elevation view of a workpiece disposed at an angle relative to a welding head in accordance with prior art practice.
Figure 2:
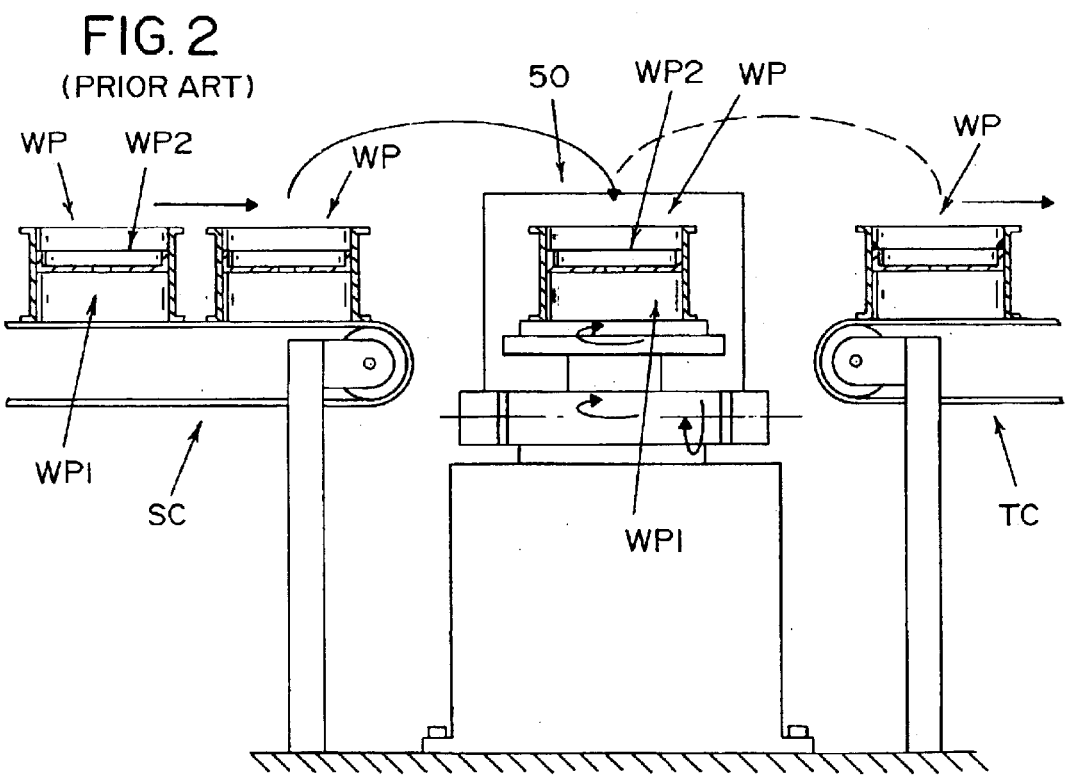
FIG. 2 is a side elevation view of a known robotic positioner shown in use with associated supply and take-away conveyors.
Figure 3:
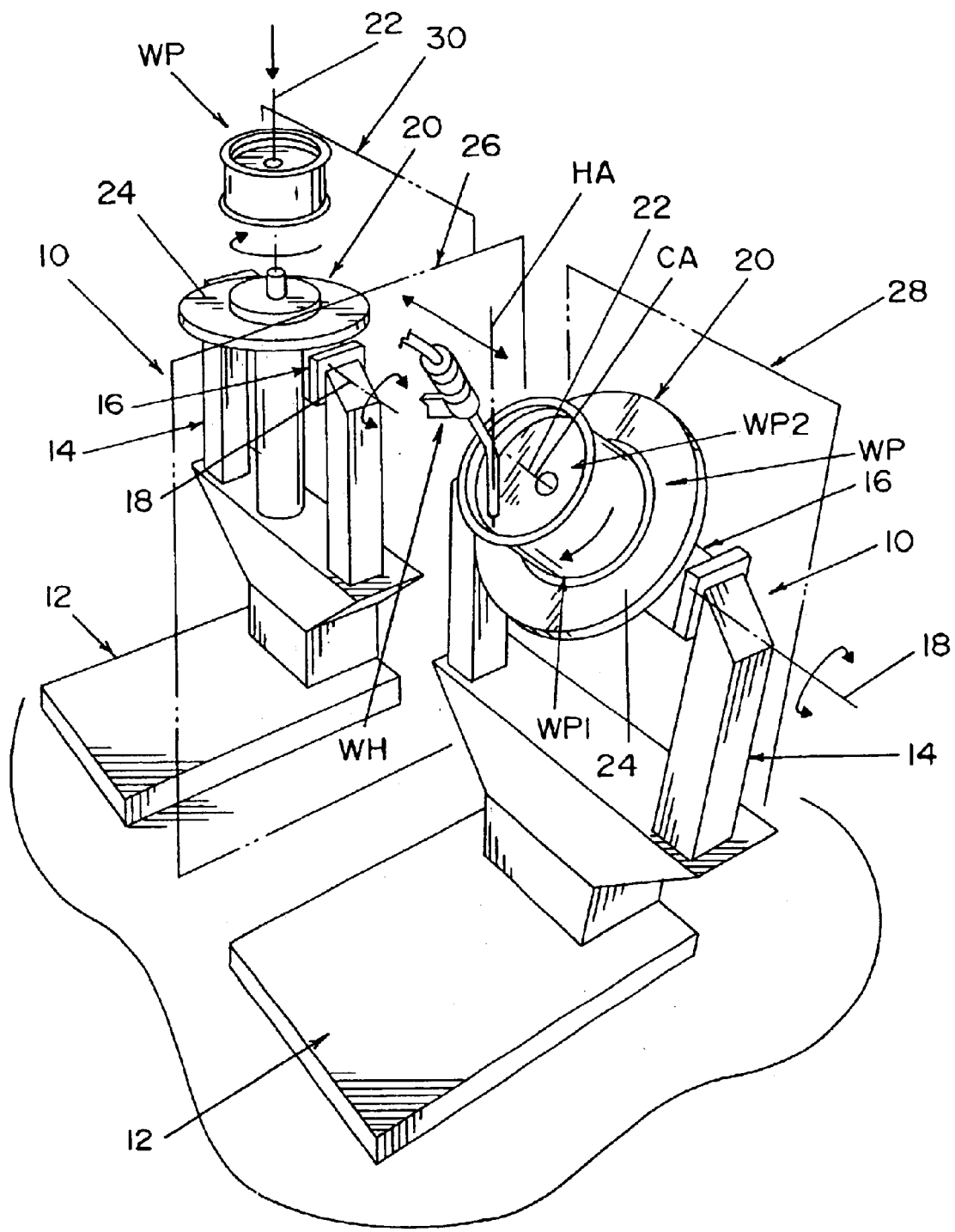
FIG. 3 is a perspective view of a pair of known robotic positioners shown in use with a welding head of an associated automated welding system.
Figure 4:
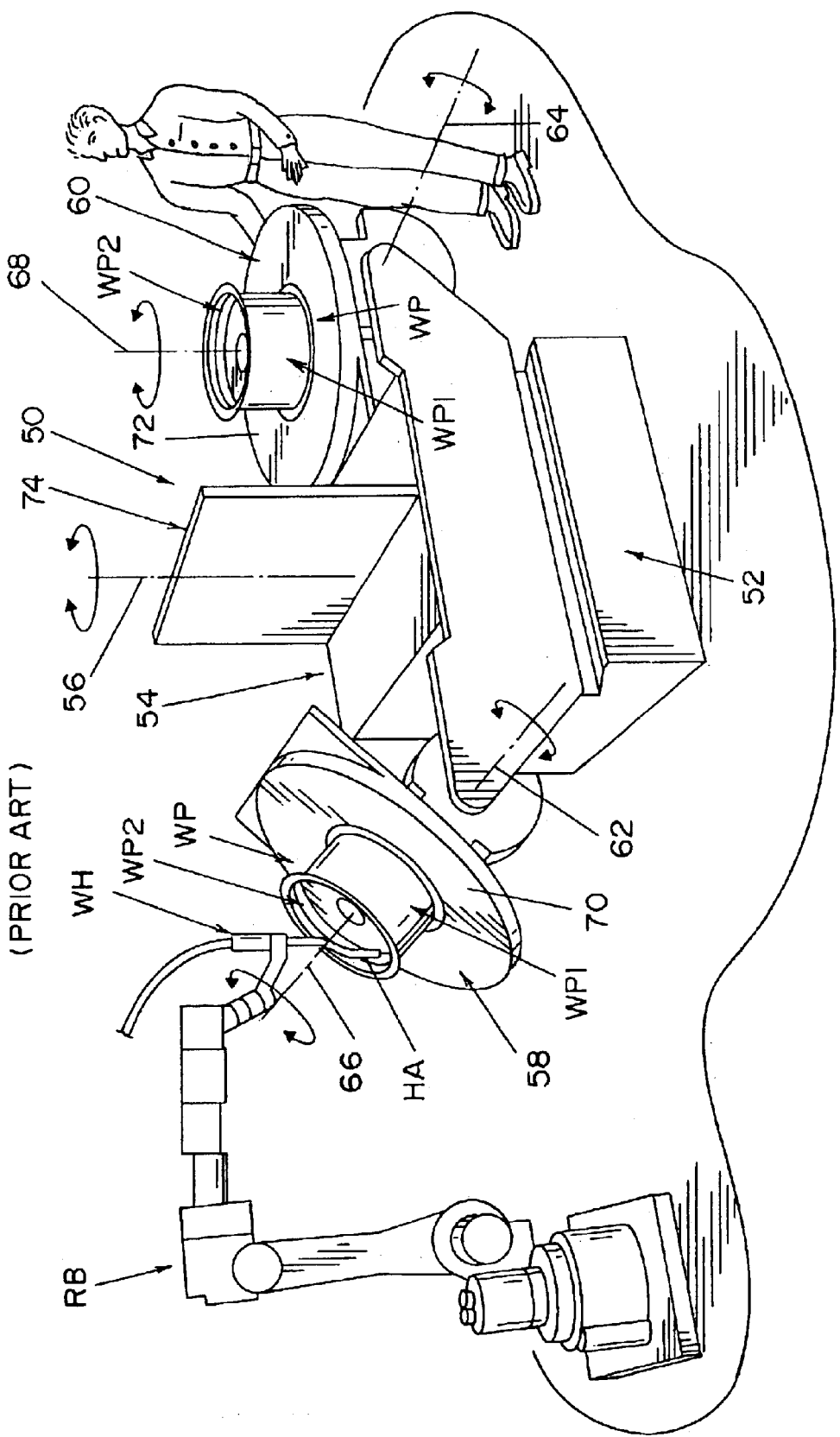
FIG. 4 is a perspective view of another known robotic positioner shown in use with an associated automated welding system.

Referring to the drawings wherein the showings are for the purpose of illustrating preferred embodiments of the invention and not limiting the same, FIG. 1 illustrates a conventional workpiece WP, such as a wheel rim, in association with a typical welding head WH. FIG. 2 illustrates a known robotic positioner shown in use with supply and take-away conveyors SC and TC, and FIGS. 3 and 4 illustrate known robotic positioners, each shown with a conventional welding head supported on a welding robot. The following discussion of FIGS. 1–4 is merely provided to establish a background environment and terminology for further discussion of the preferred embodiments of the invention.

In FIG. 1, a conventional workpiece WP is shown having two workpiece portions WP1 and WP2. The two workpiece portions are positioned adjacent one another in a manner suitable for joining, such as by a conventional welding operation, for example. A welding head WH, extending generally vertically downward and defining a welding head axis HA, is positioned adjacent the two associated portions of the workpiece and a weld bead WB is deposited along the two workpiece portions effectively joining the same as the workpiece is rotated about a workpiece axis CA. Commonly, when the welding head extends vertically downward, the workpiece is disposed at an angle WA relative to vertical to improve weld quality and the appearance of the weld bead. In FIG. 1 the workpiece is shown disposed at an angle of about 45 degrees. However, it is well known to those of skill in the art to vary the angle at which the welding head is related to the workpiece. This is commonly done to improve characteristics of the welded joint, such as joint strength and appearance, depending on the geometry of the surfaces to be welded. Typically this is accomplished by varying the orientation of the workpiece, rather than re-orienting the angle of the welding head, which preferably remains extending vertically downward. It will be appreciated that the workpiece shown in FIG. 1 is simply an example of the many various shapes, sizes and joint configurations known in the art.

FIG. 2 illustrates a known robotic positioner, such as positioner 50 shown in further detail in FIG. 4, shown in use with a supply conveyor SC and a take-away conveyor TC. While it is desirable to have the workpiece introduced to the welding head in an inclined orientation from horizontal, as discussed above, it is also desirable to load a workpiece onto and unload a workpiece from a robotic positioner in a generally horizontal orientation, as the workpieces are generally supplied and taken away via the conveyors in such an orientation. That is, it is desirable to enable an operator to transfer a workpiece from the supply conveyor to the robotic positioner and from the robotic positioner to the take-away conveyor without the need to rotate, manipulate or otherwise re-orient the workpiece, as illustrated in FIG. 2.

In light of the foregoing discussion, it is known to be desirable to have a robotic positioner that provides a generally horizontal load/unload work surface while also presenting the workpiece to the associated welding head in an inclined orientation relative to horizontal. Two such known robotic positioners 10 are shown adjacent one another in FIG. 3. Each robotic positioner 10 includes a base 12, a support structure 14, and a cross member 16 rotatably supported on the support structure and having a first axis 18. A first actuator, not shown, outputs pivotal motion to cross member 16. A turntable 20 is rotatably supported on the cross member and has a second axis 22, with a second actuator, not shown, outputting rotational motion to the turntable. A workpiece WP is supported on a work surface 24 of the turntable. The workpiece is positioned adjacent welding head WH, which extends generally vertically downward along welding head axis HA. The turntable is pivoted about axis 18 such that workpiece WP is disposed at an angle relative to the welding head and the associated axis thereof.

As each of the robotic positioners shown in FIG. 3 includes only one work surface, each positioner generally only supports one workpiece at a time. As such, two robotic positioners are commonly used together so that an operator can load and unload a workpiece from one positioner while a welding operation is occurring between the weld head and the workpiece supported on the other robotic positioner. Each of the two robotic positioners has at least three movements, including tilting the work surface from horizontal to an inclined orientation, rotating the work surface for processing, and returning the work surface from the inclined orientation to horizontal. As a result, a robotic positioning system having two positioners requires a total of at least six movements, as well as at least four attendant actuator arrangements, not shown, as well as a control system therefor.

Additionally, since two spaced-apart robotic positioners are being used, the operator typically walks back-and-forth between the positioners to load/unload one while the other is supporting a workpiece during a welding operation. In such situations, numerous shields are typically used to deflect the splatter from the welding operation and also to provide a visual shield from the welding arc. Typically, one shield 26 is disposed between the two robotic positioners, and other shields 28 and 30 are positioned adjacent each of the positioners. Commonly, shields 28 and 30 are moved into and out of position to provide the operator access to the robotic positioner when in the load/unload state.

Another known robotic positioner 50 is illustrated in FIG. 4. The robotic positioner is shown in use with a welding head WH supported on a welding robot RB. The robotic positioner includes a base 52 and a support structure 54 rotatably supported on the base and having an axis 56. Two turntables 58 and 60 are pivotally and rotatably supported on the support structure and respectively have pivot axes 62 and 64 and axes of rotation 66 and 68. Each turntable respectively includes a work surface 70 and 72 that is suitable for supporting a workpiece WP. Typically, a shield 74 extends laterally between the two turntables.

In FIG. 4, welding head WH is disposed generally vertically downward. Turntable 58 and the workpiece supported thereon are shown disposed at an angle relative to the vertical axis of the welding head for welding the workpiece. At the same time, turntable 60 is disposed generally horizontally for the loading and unloading of a workpiece WP. As such, robotic positioner 50 includes five axes about which one or more portions of the positioner rotate, including axis 56 about which the support structure, turntables and shield rotate, axes 62 and 64 about which the turntables pivot between horizontal and a non-horizontal orientation, and axes 66 and 68 of the turntable about which the workpieces can rotate. Accordingly, it will be appreciated that the robotic positioner shown in FIG. 4 proceeds through at least nine movements in processing two workpieces, including revolving the first workpiece from the load/unload position toward the work position, pivoting the first workpiece from horizontal to an inclined orientation, rotating the workpiece, pivoting back to horizontal, revolving the first and second workpieces respectively to and from the work position, pivoting the second workpiece from horizontal to inclined, rotating the second workpiece, pivoting from inclined to horizontal, and revolving the second workpiece back to the load/unload position. Moreover, the robotic positioner includes at least five actuator arrangements, not shown, attendant to the axes about which these movements take place, as well as a control system, not shown, therefor. As such, this type of robotic positioner can be complex and expensive.

Figure 5:
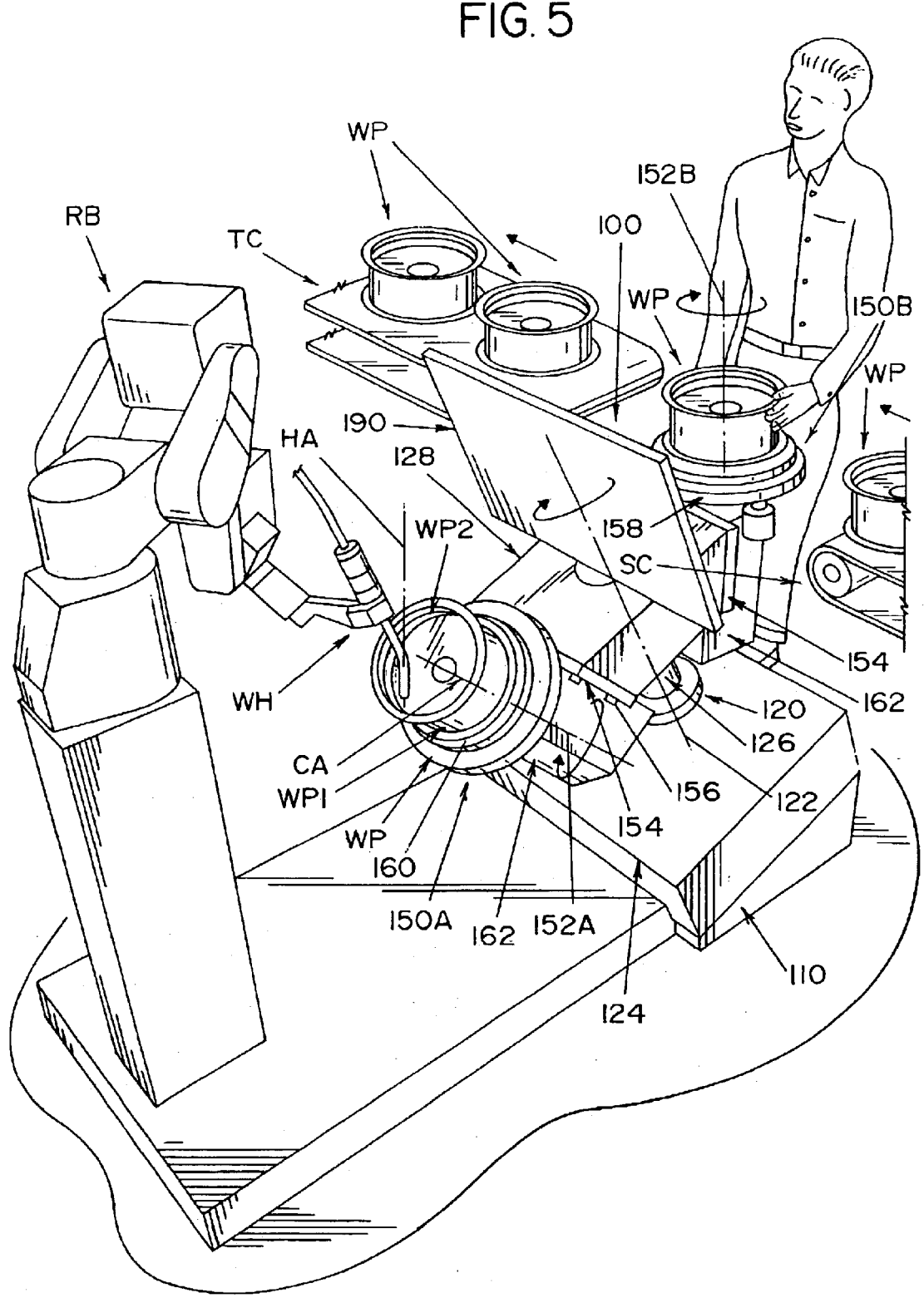
FIG. 5 is a perspective view of a robotic positioner in accordance with the present invention shown in use with an associated automatic welding system and associated supply and take-away conveyors.
Figure 6:
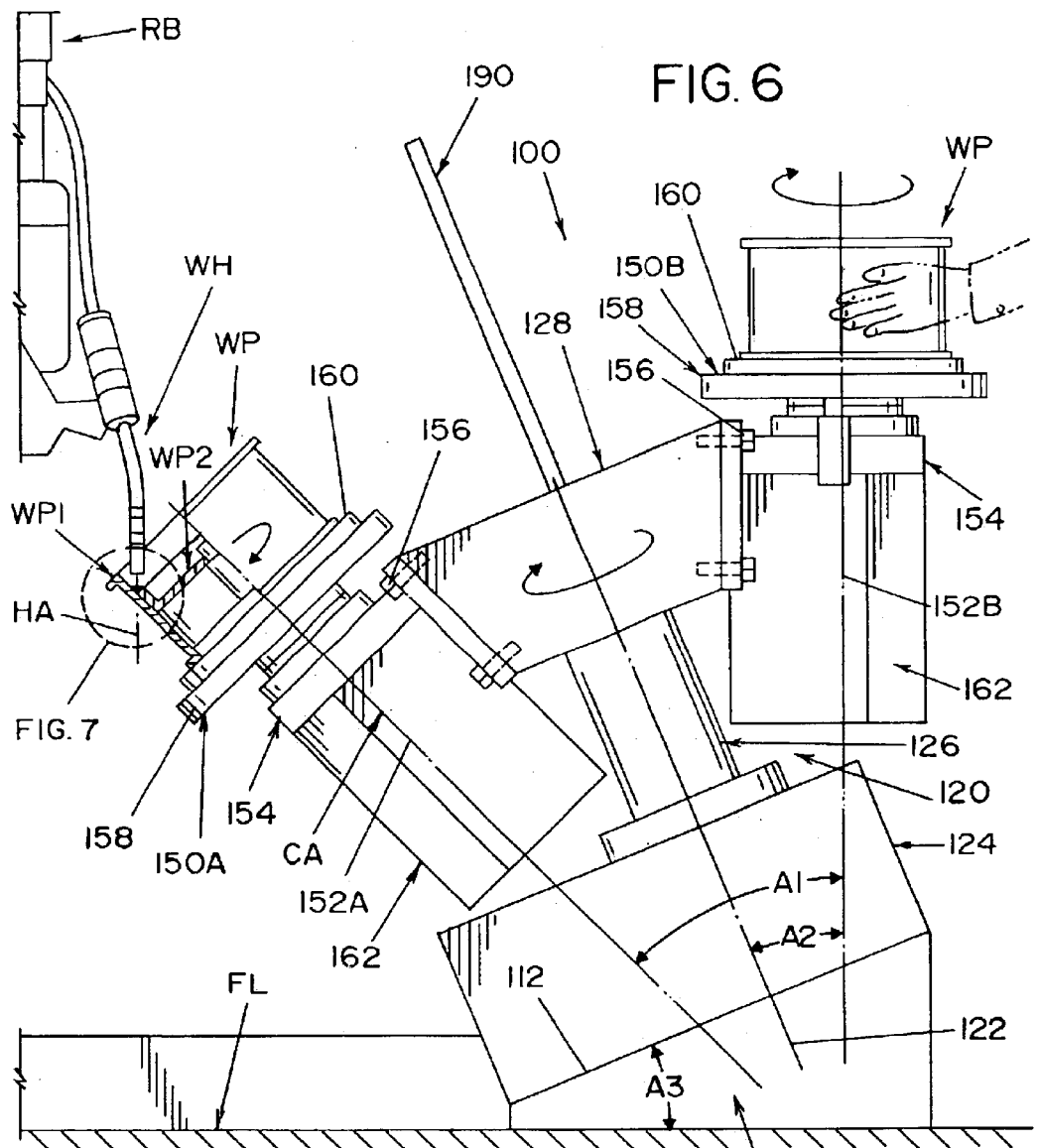
FIG. 6 is a side elevation view, partially in section, of the robotic positioner and welding head shown in FIG. 5.

Referring now in greater detail to FIGS. 5–14 of the drawings, showing preferred embodiments of the invention, FIGS. 5 and 6 illustrate a robotic positioner 100 in accordance with the present invention in use with a welding robot RB supporting a welding head WH extending generally vertically downward along welding head axis HA. Supply conveyor SC and take-away conveyor TC are shown adjacent positioner 100 for respectively supplying unprocessed workpieces and taking away processed workpieces. As can be better seen in FIG. 6, robotic positioner 100 comprises a support arrangement which includes a base 110, a support structure 120 on base 110 and having an axis 122 about which the support structure can rotate. Two turntables 150A, 150B are supported on support structure 120 and respectively have an associated axis of rotation 152A and 152B. It will be appreciated that turntables 150A and 150B are substantially identical and that the alphabetic characters (A and B) following the various item numbers are included simply to differentiate between respective positions and/or parts of the two turntables.

Support structure 120 includes a lower support portion 124, a pedestal portion 126 rotatably supported on lower portion 124, and an upper support portion 128 supported on pedestal portion 126. An actuator, not shown, provides rotational output to pedestal portion 126, either through direct engagement of the pedestal portion or through a suitable transmission. Turntables 150A and 150B each include a mounting and support member 154 that is removably supported on upper support portion 128 of support structure 120 in any suitable manner, such as by using fasteners 156. The turntables each include a platform 158 having a work surface 160 suitable for supporting a workpiece WP. Each platform is rotatably supported on the associated mounting and support member 154, such as by a suitable anti-friction bearing, not shown, for example. An actuator 162 is supported on member 154 beneath platform 158 and provides rotational output to the platform, either by direct engagement or through a suitable transmission, not shown. A shielding member 190 extends upwardly from support portion 128 generally laterally between turntables 150A and 150B.

Axis 152A of turntable 150A extends at an angle A1 from axis 152B of turntable 150B. Axis 122 of support structure 120 is disposed between axes 152A and 152B at an angle A2 to axis 152B as shown in FIG. 6. Axis 152B is shown in FIG. 6 as being generally vertical. It should be appreciated, however, that axis 152B is not intended to be limited to vertical and can, therefore, be disposed at an angle relative to vertical. However, with axis 152B extending generally vertically and the floor FL shown as being generally horizontal, a top surface 112 of base 110 is shown in FIG. 6 as being disposed at an angle A3 that is generally the same as angle A2 that extends between axis 152B and axis 122. It should be further appreciated that in situations where axis 152B is not vertical, angles A2 and A3 may not be the same, as they are in FIG. 6. Preferably, angle A1 is from about 10 degrees to about 80 degrees, angle A2 is from about 5 degrees to about 40 degrees, and angle A3 is from about 5 degrees to about 40 degrees. More preferably, angle A1 is from about 40 degrees to about 50 degrees, angle A2 is from about 20 degrees to about 25 degrees, and angle A3 is from about 20 degrees to about 25 degrees. Angle A1 is shown in FIG. 6 as being about 45 degrees and angles A2 and A3 are shown as being about 22.5 degrees. It will be appreciated, however, that angle A2 is not limited to being about one-half of angle A1. That is, angle A2 can be more than or less than one-half of angle A1 without departing from the principles of the present invention.

Figure 7:
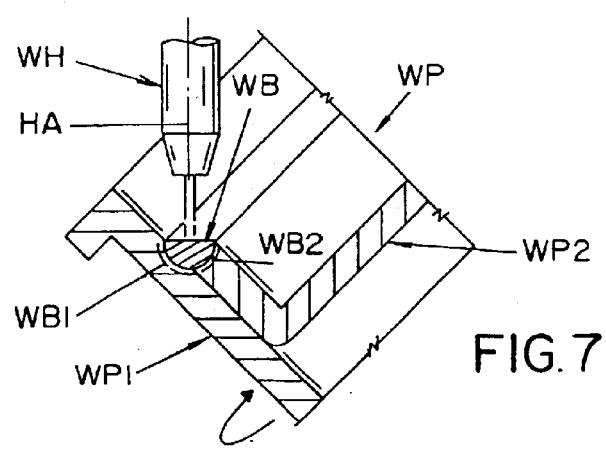
FIG. 7 is an enlarged cross-sectional side elevation view of the workpiece and welding head shown in FIG. 6.

FIG. 7 is an enlarged cross-sectional side view of the workpiece WP and welding head WH shown in FIG. 6. The welding head extends vertically downward along axis HA. The workpiece is disposed at an angle, shown as angle A1 in FIG. 6, relative to axis HA, which is shown extending generally vertically. The workpiece includes two workpiece portions WP1 and WP2. Turntable 150A is rotated about axis 152A to rotate the workpiece, and weld bead WB is deposited by the welding head along respective adjacent joining surfaces of workpiece portions WP1 and WP2. The weld bead is shown generally evenly spaced between these joining surfaces such that bead portions WB1 and WB2 are of relatively the same length along the surfaces of the associated workpiece portions.

FIG. 8 illustrates another embodiment of a robotic positioner 200 in use with an associated welding robot RB and a welding head WH that is disposed along a generally vertical welding head axis HA. In this embodiment, robotic positioner 200 includes a base 210 and a support structure 220 having an axis 222 about which the support structure can rotate. Base 210 and support structure 220 are interconnected by a pivot arrangement 214 and an associated adjustment screw arrangement 216 which enable the support structure and axis 222 to be angularly adjusted or pivoted relative to base 210. The pivot arrangement includes a pivot post 215. Two turntables 250A and 250B are supported on the support structure and respectively have axes of rotation 252A and 252B. It will be appreciated that turntables 250A and 250B are substantially identical as in the previous embodiment.

Support structure 220 includes a lower support portion 224, a pedestal portion 226 rotatably supported on lower portion 224, and an upper support portion 228 supported on pedestal portion 226. An actuator, not shown, provides rotational output to pedestal portion 226, either through direct engagement of the pedestal portion or through a suitable transmission, not shown. Support structure 220 also includes two angular adjustment members 230 extending from upper portion 228 and removably secured thereto, such as by fasteners 232, for example. Each of the angular adjustment members has a first or outer end 234 and a second or inner end 236 extending at an angle A4 to the first end. Preferably, but not necessarily, first end 234 will extend generally parallel to axis 222 and second end 236 will extend generally parallel to an axis of an associated turntable, such as axis 252A of turntable 250A, for example. Turntables 250A and 250B each include a mounting and support member 254 removably supported on an adjustment member 230 in any suitable manner, such as by fasteners 256. It will be appreciated that one or more sets of angular adjustment members can be manufactured, with each set having a different value for angle A4. As such, as the support structure is reoriented using pivot and adjustment screw arrangements 214 and 216, suitable angular adjustment members can be installed to orient the turntables at the desired angles. Each turntable includes a platform 258 having a work surface 260 suitable for supporting a workpiece WP. Each platform 258 is rotatably supported on the associated mounting and support member 254, such as by a suitable anti-friction bearing, not shown, for example. An actuator 262 is supported on each mounting and support member 254 beneath platform 258 and provides rotational output to the platform, either by direct engagement or through a suitable transmission, not shown. A shielding member 290 extends upwardly from support portion 228 generally laterally between turntables 250A and 250B.

Axis 252A of turntable 250A extends at an angle A5 from axis 252B of turntable 250B. Axis 222 of support structure 220 is disposed between axes 252A and 252B and at an angle A6 to axis 252B, as shown in FIG. 8. Axis 252B is shown in FIG. 8 as being generally vertical. However, it will be appreciated that axis 252B is not intended to be limited to vertical and can, therefore, be disposed at an angle relative to vertical without departing from the principles of the invention. As such, pivot 214 and adjustment screw arrangement 216 together allow for the angular adjustment of support structure 220 relative to base 210 and the resulting angular adjustment of turntables 250A and 250B supported thereon. Preferably, angle A4 is from about 5 degrees to about 40 degrees, angle A5 is from about 10 degrees to about 80 degrees, and angle A6 is from about 5 degrees to about 40 degrees. More preferably, angle A4 is from about 20 degrees to about 25 degrees, angle A5 is from about 40 degrees to about 50 degrees and angle A6 is from about 20 degrees to about 25 degrees. Angle A3 is shown in FIG. 8 as being about 50 degrees, and angles A4 and A6 are shown as being about 25 degrees. It will be appreciated, however, that angle A6 is not limited to being about one-half of angle A5. That is, A6 can be more than or less than one-half of angle A5 without departing from the principles of the present invention.

FIG. 9 illustrates an enlarged cross-sectional side view of the workpiece WP and welding head WH shown in FIG. 8. The welding head extends vertically downward along axis HA. The workpiece is disposed at an angle, shown as angle A5 in FIG. 8, relative to axis HA. The workpiece includes two workpiece portions WP1 and WP2. When the turntable is rotated, a weld bead WB is deposited by the welding head along respective adjacent joining surfaces of workpieces portions WP1 and WP2. The weld bead is shown unevenly spaced between these joining surfaces, such that weld bead portion WB3 has a substantially longer length than weld bead portion WB4. As indicated above, angle A5 in FIG. 8 is shown at about approximately 50 degrees. The approximately 5 degree difference between angle A5 and angle A1, which is shown in FIG. 6 at 45 degrees, results in the variation of the length of the weld bead portions. It is known by those of skill in the art to vary the deposition of the weld bead along the workpiece joint depending on the joint geometry to provide desired characteristics, such as joint strength and surface finish. The adjustability of the angles, as discussed above, provides the desired flexibility in processing workpieces to achieve these desired characteristics.

Figure 10:
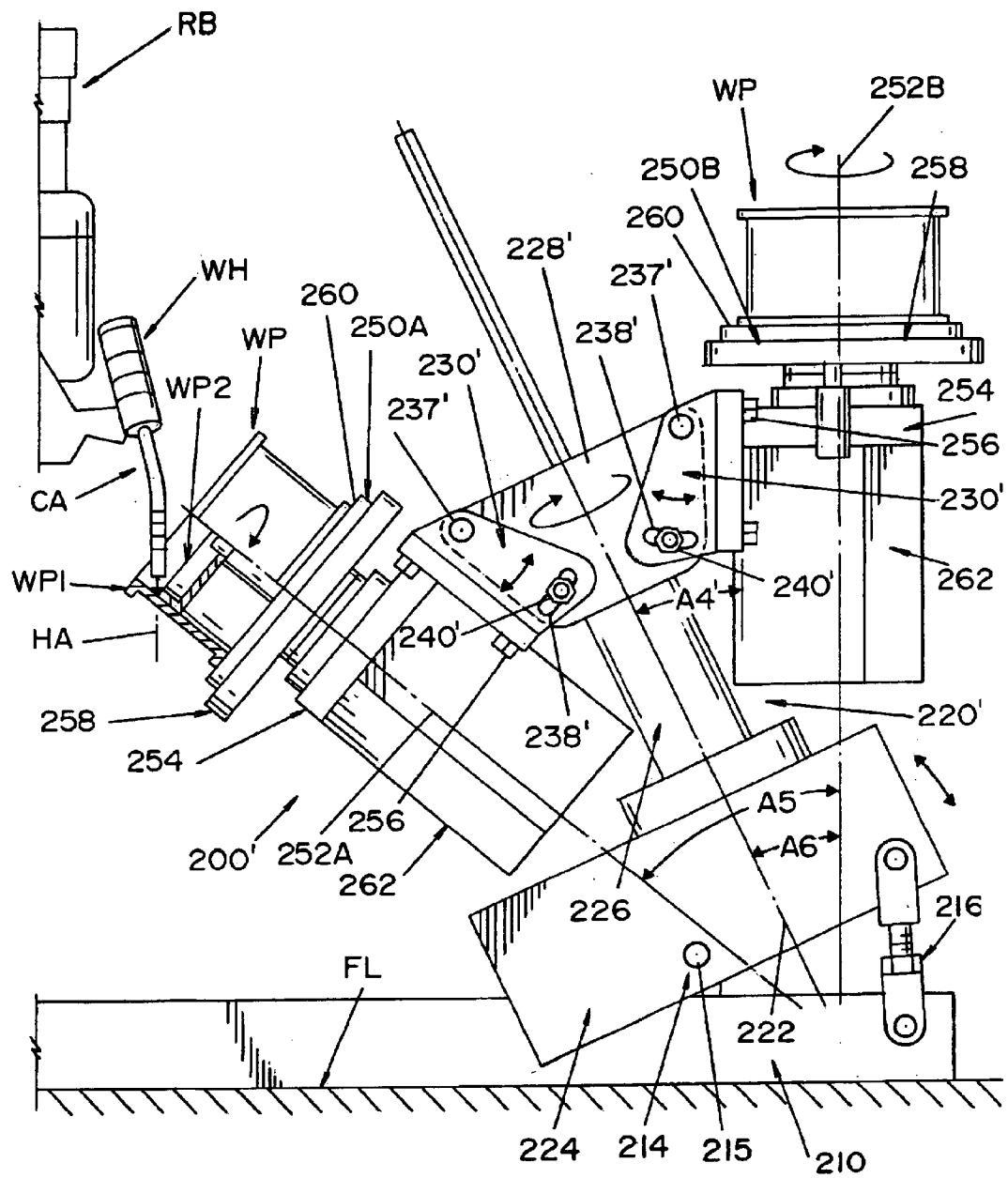
FIG. 10 is a side elevation view, partially in section, of still another embodiment of a robotic positioner in accordance with the present invention shown with an associated welding head.

FIG. 10 illustrates another embodiment of a robotic positioner 200' in use with an associated welding robot RB and a welding head WH that is disposed along a generally vertical welding head axis HA. Robotic positioner 200' is substantially similar to robotic positioner 200 illustrated in FIG. 8 and includes a base 210, a support structure 220' having an axis 222 about which the support structure can rotate. Two turntables 250A and 250B are supported on the support structure and respectively have axes of rotation 252A and 252B. Support structure 220' includes a lower support portion 224, a pedestal portion 226 rotatably supported on lower portion 224, and an upper support portion 228' supported on pedestal portion 226. In this embodiment, the support structure includes two angular adjustment members 230' each supported on upper support portion 228' by a pivot pin 237' and a slot 238'. Slot 238' is of sufficient length to permit the displacement of each angular adjustment member 230' through a range of values for angle A4'. A clamping member, such as fastener 240', extends through slot 238' to secure adjustment member 230' in a desired position. The angular adjustment provided by the pivot pin and slot eliminates the need to have numerous different angular adjustment members 230 as shown and describe with regard to FIG. 8.

Figure 11:
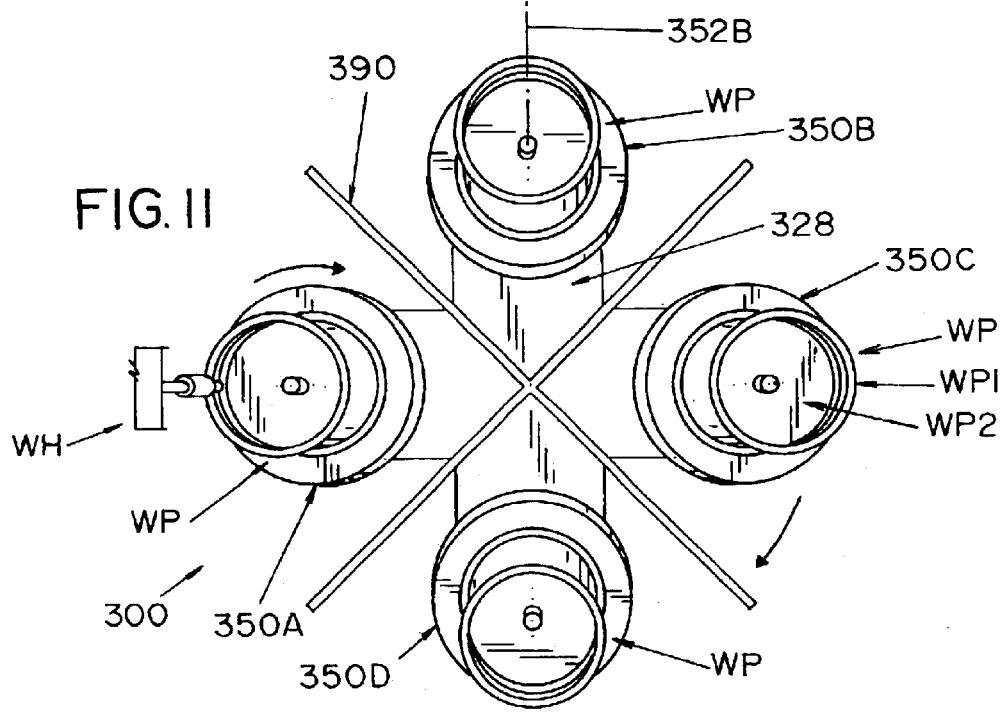
FIG. 11 is a plan view of yet another embodiment of a robotic positioner in accordance with the present invention shown in use with an associated welding head.
Figure 12:
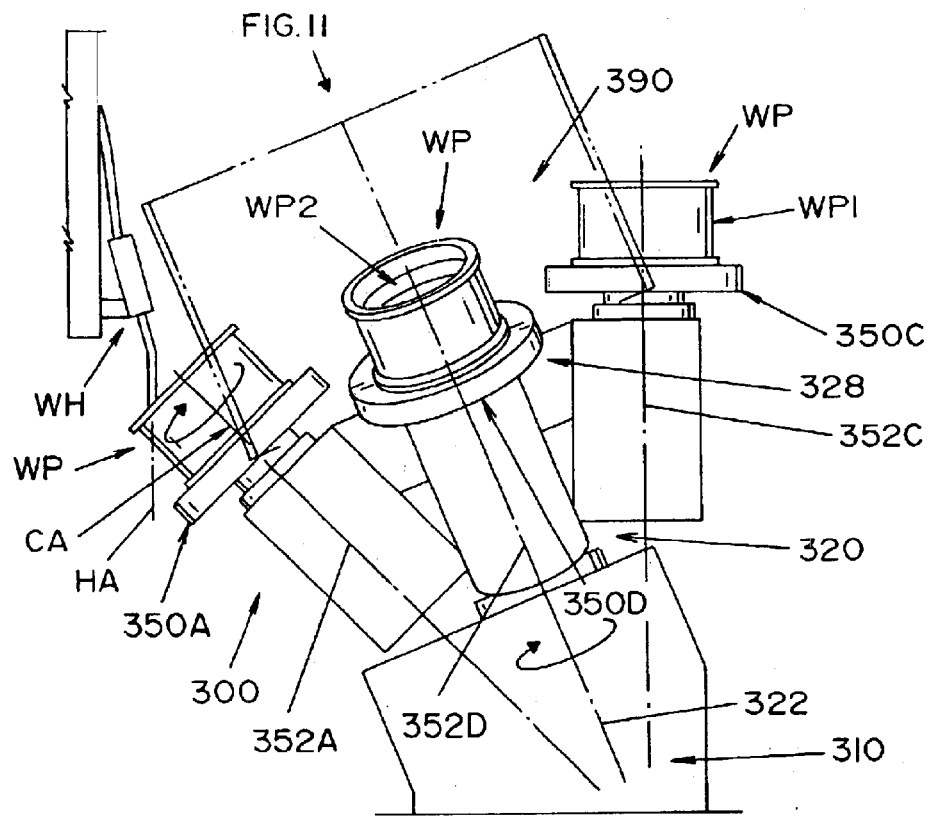
FIG. 12 is a side elevation view of the robotic positioner and associated welding head shown in FIG. 11.

FIGS. 11 and 12 illustrate another embodiment of a robotic positioner 300 in use with an associated welding head WH. Robotic positioner 300 comprises a support arrangement that includes a base 310, a support structure 320 having an axis 322 about which the support structure can rotate. Four turntables 350A–D are supported on the support structure and are respectively rotatable about axes 352A–D. It will be appreciated that turntables 350A–D are substantially identical. An X-shaped shielding member 390 is supported on upper support structure 328 and extends laterally between adjacent ones of the turntables. Robotic positioner 300 is shown in FIGS. 11 and 12 as being otherwise substantially similar to robotic positioner 100 shown and described with reference to FIGS. 5 and 6, and robotic positioner 300 generally includes the structure and features discussed with regard thereto. It will be appreciated, however, that other structural components and features, such as those shown in FIGS. 8 and 10 and respectively described with regard to positioners 200 and 200', can be included in robotic positioner 300 without departing from the principles of the present invention.

Figure 13:
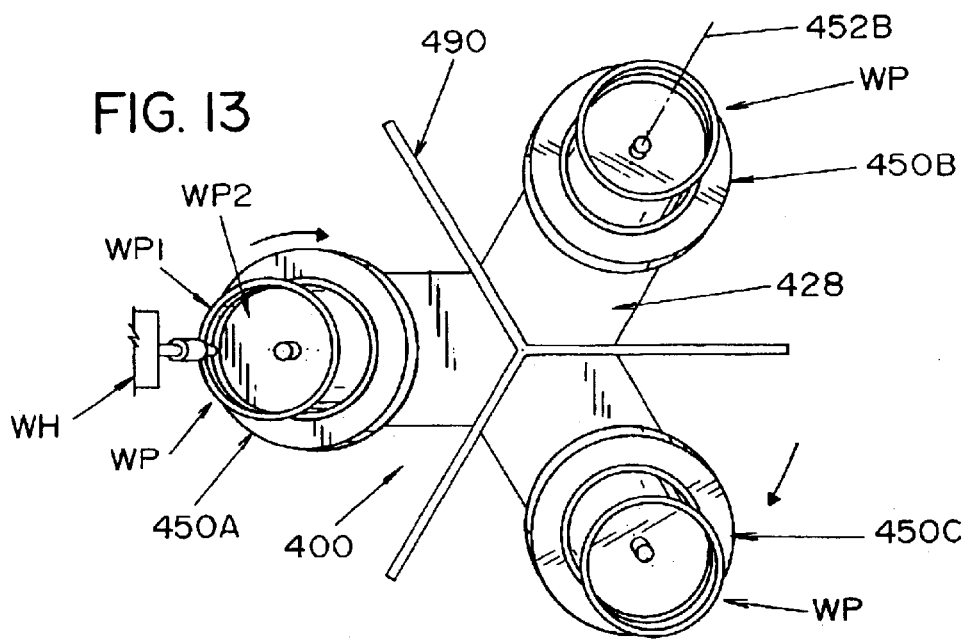
FIG. 13 is a plan view of a further embodiment of a robotic positioner in accordance with the present invention shown in use with an associated welding head; and, FIG. 14 is a side elevation view of the robotic positioner and associated welding head shown in FIG. 13.
Figure 14:
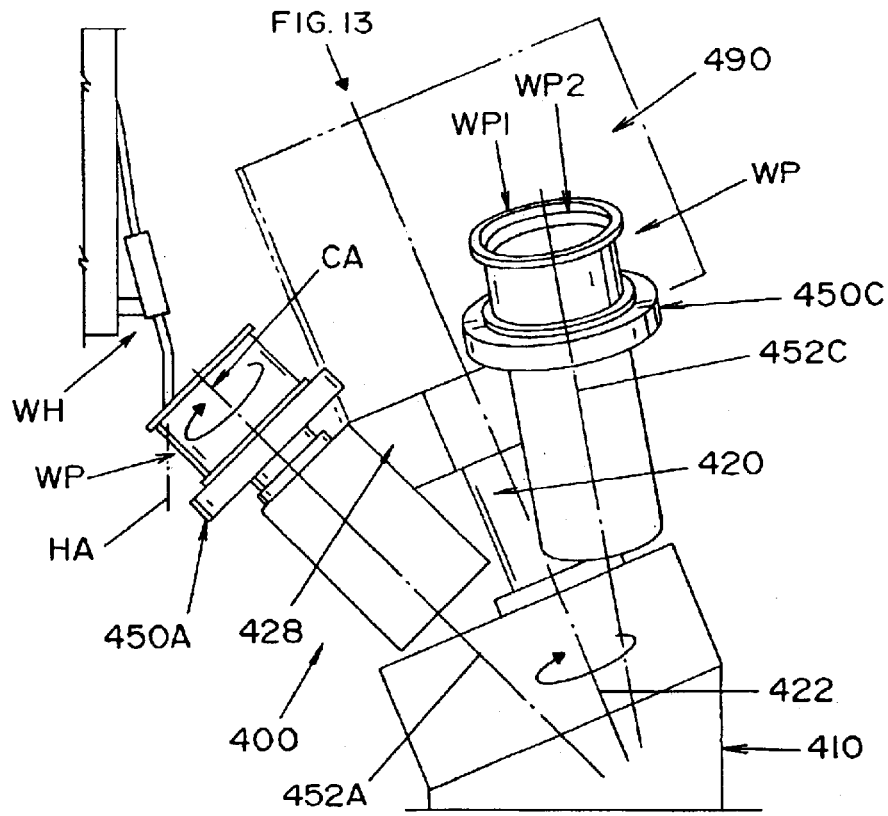

FIGS. 13 and 14 illustrate yet another embodiment of a robotic positioner 400 in use with an associated welding head WH. Robotic positioner 400 includes a base 410, a support structure 420 having an axis 422 about which the support structure can rotate. Three turntables 450A–C are supported on the support structure and are respectively rotatable about axes 452A–C. It will be appreciated that turntables 450A–C are substantially identical. A Y-shaped shielding member 490 is supported on upper support structure 428 and extends laterally between adjacent ones of the turntables. Robotic positioner 400 is shown in FIGS. 13 and 14 as being otherwise substantially similar to robotic positioner 100 shown and described with reference to FIGS. 5 and 6, and robotic positioner 400 generally includes the structure and features discussed with regard thereto. It will be appreciated, however, that other structural components and features, such as those shown in FIGS. 8 and 10 and respectively described with regard to positioners 200 and 200', can be included in robotic positioner 400 without departing from the principles of the present invention.

It will be appreciated that a robotic positioner in accordance with the present invention will move a workpiece secured on a work surface from a generally horizontal load/unload position to an inclined work position and back to the generally horizontal load/unload position by revolving the work surface about a central axis that is disposed at an angle relative to vertical. Preferably, the positioner will include two or more work surfaces so that multiple workpieces can be in process at one time, thereby increasing production rates. Robotic positioners in accordance with the present invention can include more than two work surfaces, such as robotic positioner 300 shown in FIGS. 11 and 12 and robotic positioner 400 shown in FIGS. 13 and 14, respectively illustrating a robotic positioner having four and three work surfaces. Such robotic positioners have one or more work surfaces disposed between the load/unload position and the work position. This can further increase throughput and also provide additional positions for further operations, such as a deburring or cleaning operation, for example.

Workpieces WP are shown and described herein as being generally cylindrical parts with such parts being rotated about a turntable axis to perform the welding operation. However, it will be appreciated that workpieces of other shapes, sizes and configurations are entirely suitable for use with the present invention. In that regard, the subject invention is not intended to be limited to turntables that are rotatable. For example, a non-cylindrical workpiece can be supported on one of the work surfaces of the present robotic positioner in a predetermined orientation. The structural support can rotate the part into position adjacent a weld head, and the welding process can be completed using a programmable robot to move the welding head along a predetermined path corresponding at least in part to the shape or configuration of the workpiece. As such, the present invention is not intended to be in any way limited to the use of a turntable that has a work surface that must rotate about an axis of the turntable.

While considerable emphasis has been placed on the preferred embodiments of the invention illustrated and described herein, it will be appreciated that other embodiments can be made and that many modifications can be made in the embodiments shown and described without departing from the principles of the present invention. Obviously, such modifications and alterations will occur to others upon reading and understanding the preceding detailed description, and it is intended that the subject invention be construed as including all such modifications and alterations insofar as they come within the scope of the appended claims or the equivalents thereof. Accordingly, it is to be distinctly understood that the foregoing descriptive matter is to be interpreted merely as illustrative of the invention and not as a limitation.

What is claimed is:

1. A robotic positioner for supporting an associate workpiece, above an associated floor surface, said robotic positioner comprising:
    a base on the associated floor;
    a workpiece support structure supported on said base for rotation about an axis extending at a substantially non-zero angle relative to vertical; and,
    a work surface on said support structure for supporting the associated workpiece;
    said work surface being revolvable about said axis with said support structure between first and second positions in which said work surface is respectively disposed at a first angle to vertical and at a second angle to vertical with said first and second angles being different from one another.

2. A robotic positioner in accordance with claim 1, wherein said angle of said support structure is about 22.5 degrees.

3. A robotic positioner in accordance with claim 1, wherein said first angle to vertical is about 90 degrees.

4. A robotic positioner in accordance with claim 1, wherein said second angle to vertical is about 45 degrees.

5. A robotic positioner in accordance with claim 1, wherein said support structure includes a lower support portion supported on said base, a pedestal portion extending from said lower support portion, and an upper support portion secured on said pedestal portion.

6. A robotic positioner in accordance with claim 5, wherein said upper support portion includes an upper mounting block secured on said pedestal portion and a plurality of angular mounting blocks supported on said upper mounting block.

7. A robotic positioner in accordance with claim 5, wherein said lower support portion is mounted in an affixed orientation on said base, and said pedestal portion is rotatably supported on said lower support portion.

8. A robotic positioner in accordance with claim 5, wherein said lower support portion is pivotally supported on said base.

9. A robotic positioner for supporting a workpiece, said robotic positioner comprising:
    a workpiece support structure supported for rotation about an axis extending at an angle relative to vertical, said support structure including a lower support portion, a pedestal portion and an upper support portion; and,
    a work surface on said support structure for supporting the workpiece, said work surface being supported on said upper support portion, and said upper support portion including an adjustment member for adjusting the position of said work surface relative to said upper support portion;
    said work surface being revolvable about said axis with said support structure between first and second positions in which said work surface is respectively disposed at a first angle to vertical and at a second angle to vertical.

10. A robotic positioner in accordance with claim 9, wherein said adjustment member is pivotally supported on said upper support portion.

11. A robotic positioner in accordance with claim 1, wherein said work surface is a first work surface and said robotic positioner further includes a second work surface on said support structure, said second work surface being rotatable about said axis with said support structure between said first and second positions in which said second work surface is respectively disposed at said first angle to vertical and at said second angle to vertical.

12. A robotic positioner for supporting associated workpieces, said robotic positioner comprising:
    a workpiece support structure supported for rotation about an axis extending at a substantially non-zero angle relative to vertical;
    first and second work surfaces on said support structure for supporting the associated workpieces; and,
    a shielding member between said first and said second work surfaces;
    said first and second work surfaces being revolvable about said axis with said support structure between first and second positions, in said first position said work surfaces being disposed at a first angle to vertical and in said second position said work surfaces being disposed at a second angle to vertical, said first and second angles being different from one another.

13. A robotic positioner in accordance with claim 1 further comprising a platform supporting said work surface on said support structure.

14. A robotic positioner in accordance with claim 13, wherein said platform is rotatably supported on said support structure.

15. A robotic positioner in accordance with claim 1, wherein said work surface is a first work surface and said robotic positioner includes a plurality of work surfaces supported on said support structure, each of said work surfaces being spaced from said axis and being revolvable therearound between said first and said second positions, each work surface being disposed at said first angle to vertical in said first position and at said second angle to vertical in said second position.

16. A robotic positioner for sequentially supporting first and second associated workpieces relative to a welding head of an automatic welding system, said robotic positioner comprising:

a floor-engaging base;

a support structure rotatably supported on said base and having a structure axis extending along a substantially vertical first plane at a substantially non-zero angle relative to vertical;

a first work surface on said support structure for rotation therewith and for supporting the first associated workpiece, said first work surface having a first axis and extending transverse to said first axis;

a second work surface on said support structure for rotation therewith and for supporting the second associated workpiece, said second work surface having a second axis and extending transverse to said second axis; and, said first and second axes extending at a substantially non-zero angle to said structure axis and to each other.

17. A robotic positioner comprising:

a base extending along an associated subjacent surface;

a work surface having a first generally horizontal position for supporting a workpiece; and a rotatable support structure extending from said base generally opposite the associated subjacent surface, said support structure having an axis disposed at a substantially non-zero structure angle relative to vertical, said support structure supporting said work surface in said first position and being rotatable about said axis to support said work surface in a second position in which said work surface is disposed at a substantially non-zero work angle relative to horizontal.

18. A robotic positioner in accordance with claim 17, wherein said structure angle is about one-half of said work angle.

19. A robotic positioner in accordance with claim 18, wherein said work angle is about 45 degrees.

20. A robotic positioner in accordance with claim 17, wherein said work surface is a first work surface and said robotic positioner is further comprised of a second work surface supported on said support structure and spaced from said axis opposite said first work surface.

21. A robotic positioner in accordance with claim 20 further comprising a shielding member between said first and said second work surfaces.

22. A robotic positioner in accordance with claim 17, wherein said support structure includes an upper support portion, a lower support portion and a pedestal portion extending between said upper and lower support portions, said pedestal portion being rotatably supported on said lower support portion.

23. A robotic positioner in accordance with claim 22, wherein said lower support portion is pivotally supported on said base for adjusting said structure angle and includes a pivot adjustment member engaging said base.

24. A robotic positioner for supporting an associated workpiece above a subjacent support surface, said robotic positioner comprising:

a base supported on said subjacent support surface;

a support structure extending upwardly from said base opposite said subjacent support surface and being rotatable about a structure axis, said structure axis extending along a vertical reference plane at a substantially non-zero axis angle relative to a vertical reference line of said vertical reference plane; and, a work surface adapted to support the associated workpieces, said work surface being supported on said support structure and revolvable therewith about said structure axis between first and second positions, said work surface defining a work surface plane and a work surface reference line extending in a direction normal to said work surface plane;

in said first position, said work surface reference line extending in substantial alignment with said vertical reference line; and, in said second position, said work surface reference line extending at a substantially non-zero work line angle to said vertical reference line.

25. A robotic positioner according to claim 24, wherein said work surface plane extends generally transverse said vertical reference plane in at least one of said first and second positions.

26. A robotic positioner according to claim 24, wherein said substantially non-zero axis angle is from about 20 degrees to about 25 degrees.

27. A robotic positioner according to claim 24, wherein said substantially non-zero work line angle is from about 40 degrees to about 60 degrees.

28. A robotic positioner according to claim 24, wherein said work surface is a first work surface, and said robotic positioner further comprises a second work surface supported on said support structure.

29. A robotic positioner according to claim 24, wherein said work surface reference line is disposed along said vertical reference plane in at least one of said first and second positions.

30. A robotic positioner according to claim 24, wherein said work surface reference line extends in a direction generally normal to said work surface.

31. A robotic positioner according to claim 1, wherein said substantially non-zero axis angle is from about 10 degrees to about 40 degrees.

32. A robotic positioner according to claim 16, wherein at least one of said first and second axes extend along said first plane.

33. A robotic positioner according to claim 16, wherein said support structure includes a lower support portion supported on said base, a pedestal portion extending from said lower support portion, and an upper support portion secured on said pedestal portion.

34. A robotic positioner according to claim 33, wherein said lower support portion is pivotally supported on said base.

35. A robotic positioner according to claim 1, wherein said work surface is rotatably supported on said support structure.

36. A robotic positioner according to claim 1, wherein said base includes a bottom surface in abutting engagement with the floor.

37. A robotic positioner according to claim 1, wherein said work surface is in abutting engagement with the work piece.

38. A robotic positioner according to claim 9, wherein said work surface is rotatably supported on said support structure.

39. A robotic positioner according to claim 12, wherein said shielding member is secured on said support structure.

40. A robotic positioner according to claim 12, wherein said first and second work surfaces are rotatably supported on said support structure.

41. A robotic positioner according to claim 16, further comprising a shielding member supported on said support structure between said first and second work surfaces.

42. A robotic positioner according to claim 16, wherein said support structure is pivotally supported on said base such that said angle of said support structure is adjustable.

43. A robotic positioner according to claim 16, wherein said work surface is rotatably supported on said support structure.

44. A robotic positioner according to claim 17, wherein said work surface is rotatably supported on said support structure.

45. A robotic positioner according to claim 24, wherein said work surface is rotatably supported on said support structure.

* * * * *